United States Patent [19]

Tomisawa

[11] Patent Number: 5,621,743
[45] Date of Patent: Apr. 15, 1997

[54] CD-ROM DECODER FOR CORRECTING ERRORS IN HEADER DATA

[75] Inventor: Shin-ichiro Tomisawa, Gifu, Japan

[73] Assignee: Sanyo Electric Co., Ltd., Osaka, Japan

[21] Appl. No.: 388,875

[22] Filed: Feb. 14, 1995

[30] Foreign Application Priority Data

Feb. 18, 1994  [JP]  Japan .................................. 6-021150
Feb. 18, 1994  [JP]  Japan .................................. 6-021151
Feb. 28, 1994  [JP]  Japan .................................. 6-030322
Feb. 28, 1994  [JP]  Japan .................................. 6-030323

[51] Int. Cl.$^6$ ............................................... G06F 11/00
[52] U.S. Cl. .......................... 371/30; 371/57.1; 371/57.2; 371/47.1; 371/67.1; 371/51.1
[58] Field of Search .......................... 371/57.1, 57.2, 371/67.1, 47.1, 51.1, 30

[56] References Cited

U.S. PATENT DOCUMENTS

| | | | |
|---|---|---|---|
| 4,669,000 | 5/1987 | Odaka et al. | 360/32 |
| 4,719,642 | 1/1988 | Lucas | 375/30 |
| 4,794,626 | 12/1988 | Tanabe et al. | 375/368 |
| 4,901,318 | 2/1990 | Tomisawa . | |
| 5,381,424 | 1/1995 | Tsang | 371/40.1 |

*Primary Examiner*—Paul P. Gordon
*Assistant Examiner*—Yoncha Kundupoglu
*Attorney, Agent, or Firm*—Loeb & Loeb LLP

[57] ABSTRACT

A CD-ROM decoder provides error correction for header data of digital data read out from a ROM disc. Address information contained in the header data of the read out digital data is stored in an address information register 31. An adder 32 adds a value "1" to a value of the address information stored in the register 31. The added value is stored in the final address information register 33 at timing delayed by one frame. A comparison circuit 35 compares the two data stored in the registers 31 and 32, respectively, and detects an error based on lack of coincidence between the two data values. When an error is detected, a selection circuit 34 selects and output address data stored in the final address information register 33.

16 Claims, 11 Drawing Sheets

CD-ROM DECODER FOR CORRECTING ERRORS IN HEADER DATA

BACKGROUND OF THE INVENTION

1. Field of the Invention

This invention relates to a CD-ROM decoder used in a CD-ROM system in which a compact disc or laser disc is employed as a read only memory. The CD-ROM decoder is used for transferring CD-ROM data read out from a disc in response to a command from a host computer.

2. Description of Related Art

A CD-ROM system, which utilizes a compact disc used in a digital audio system as a read only memory (ROM) for digital data, has been known. In such a CD-ROM system, code error correction is carried out twice for CD-ROM data read out from the compact disc in order to enhance the reliability. More particularly, first error correction is carried out in the reproduction unit, and second error correction is performed in the CD-ROM decoder connected to the reproduction unit. Generally, the first error correction is the same processing as that for an audio CD player.

Typical structure of the conventional CD-ROM system is shown in FIG. 1. A pickup unit 2 receives reflected light of a laser beam irradiated to a compact disc 1, converts the intensity of the reflected light into a voltage signal representing the intensity value, and supplies the signal to an analog signal processing unit 3. The analog signal processing unit 3 reads out digital data written in the compact disc 1 from the input signal, and outputs, in series, the digital data having a format similar to the given format. The output from the analog signal processing unit 3 is connected to an input of a digital signal processing unit 4, which carries out processing of the digital data input from the analog signal processing unit 3 in accordance with the digital data format (CD format) to produce CD-ROM data. The signal processing in the digital signal processing unit 4 maintains compatibility with a digital audio CD system, and includes, for example, demodulation of 14 bit digital data to 8 bit data and code error detection/correction based on Reed-Solomon code. A CD-ROM decoder 5 provides another code error correction for the CD-ROM data fed from the digital signal processing unit 4 and transfers the CD-ROM data, which has substantially no errors, to the host computer. A buffer RAM 6 is connected to the CD-ROM decoder 5 to temporarily store the CD-ROM data, which has been supplied from the digital signal processing unit 4 to the CD-ROM decoder 5, for a given period. A control micro computer 7 controls operation of the analog signal processing unit 3, digital signal processing unit 4 and CD-ROM decoder 5 in accordance with the operation programs so that each unit carries out the respective processing at the correct time.

A typical data format for a sector of conventional CD-ROM data is shown in FIG. 2. The CD-ROM data output from the digital signal processing unit 4 shown in FIG. 1 is divided into a number of sectors, and each sector is 2352 bytes and consists of a synchronization signal (12 bytes), header (4 bytes) and user data (2336 bytes) as shown in FIG. 2. The synchronization signal for indicating a leading point of the sector is arranged as a fixed pattern at a leader portion of the sector. The 4 byte header is allocated for information representing an absolute period corresponding to the address on the disc (MIN, SEC and FRAME: each 1 byte) and for a mode identification code for defining the format of the data in the sector (MODE: 1 byte). The CD-ROM data not including the 12 byte synchronization signal portion (i.e. the remaining 2340 byte data portion) has been subjected to scramble processing so as to prevent occurrence of the same pattern as the synchronization signal. The 2340 byte data portion is descrambled to the original data before being input to the CD-ROM recorder 5.

FIG. 3 is a block diagram of the conventional CD-ROM decoder 5. A descramble circuit 11 provides descramble processing for the 2340 bytes of the 2352 bytes (1 sector) of CD ROM data input, disregarding the 12 byte synchronization signal, and outputs data which is recovered to be a given format. A write buffer 12 extracts 2336 bytes of data (hereinafter referred to as user data) from the data output from the descramble circuit 11 and writes the user data through a first data bus 16 into the buffer RAM 6. A header register 13 takes in 4 bytes of the data output from the descramble circuit 11 and transfers the header information via a second data bus 17 to the control micro computer 7. A synchronization signal detecting circuit 14 detects a 12 byte synchronization signal assigned to the leader portion of the respective sectors of the input data and supplies a timing signal representing the beginning of the sector's CD-ROM data input to an operation control circuit 25, details of which will be described below. When the synchronization signal is not detected, data showing the detection error is fed to the control micro computer 7 via the second data bus 17. An error flag register 15 extracts an error flag indicating that errors are still left after the error correction by the digital signal processing unit 4 arranged before the CD-ROM decoder 5 and transfers the information via the second data bus 17 to the control micro computer 7.

A write address generating circuit 18 generates a series of addresses at a constant cycling period to designate a write address of the CD-ROM data which is to be written into the buffer RAM 6 from the write buffer 12. A leading address generating circuit 19 receives an address of the buffer RAM 6, to which the leader portion of the respective sectors is to be written, from the address generating circuit 18. After keeping the received addresses until completion of the writing operation for a sector of the CD-ROM data, the leading address generating circuit 19 feeds the addresses to the first data bus 16. The leading addresses are also fed to the control micro computer 7 via the second data bus 17 so as to produce preset data for a transfer address generating circuit 21. An error correction circuit 20 takes in the leading address data via the first data bus 16 and sequentially reads out, based on the address data, the CD-ROM data which was written into the buffer RAM 6. The error correction circuit 20 then detects and corrects a code error on the basis of the error detection code (EDC) and error correction code (ECC), which have been set in the user data. When the data has been subjected to given error correction processing in the above described manner, it is again written into the buffer RAM 6.

The transfer address generating circuit 21 is loaded with the preset data corresponding to the leading address of the buffer RAM 6, at which time the reading out of the CD-ROM data begins. In response to the command from the transfer trigger generating circuit 22, the transfer address generating circuit 21 generates a series of addresses beginning from an address corresponding to the preset data. The generated addresses are fed via the first data bus 16 to the buffer RAM 6 and used for the designation of the readout address of the CD-ROM data which has been subjected to the error correction processing. A transfer bytes counter 23 is loaded with preset data representing the CD-ROM data to be read out from the buffer RAM 6 and then decrements (counts down) the preset data value every time a sector of the CD-ROM data is read out from the buffer RAM 6. At the point when a given count is completed, the counter 23 supplies a stop command to the transfer trigger generating circuit 22. A transfer buffer 24 receives, via the first data bus 16, the CD-ROM data which has been read out in accordance with the address generated by the transfer address generating circuit 21 and transfers the data to the host computer. Each preset data loaded on the transfer address generating circuit 21 and transfer bytes counter 23, respectively, is generated by the control micro computer 7 based on the leading address fed from the leading address generating circuit 19 and a transfer command given by the host computer.

The operation control circuit 25 counts the time period taken for the completion of error correction made by the error correction circuit 20, on the basis of a timing signal from the synchronization signal detecting circuit 14 and generates another timing signal indicating the completion of the error correction operation. The error correction processing is carried out inside the error correction circuit 20 after taking in a sector of CD-ROM data from the buffer RAM 6, during which the next one sector of CD-ROM data is being written in the buffer RAM 6.

An interrupt command generating circuit 26 receives either the timing signal from the operation control circuit 25 or the stop command from the transfer bytes counter 23 and feeds an interrupt command to the control micro computer 7. In response to the interrupt command, the control micro computer 7, which carries out the operation control for the analog signal processing unit 3 and digital signal processing unit 4 on a time sharing basis, suspends the operation which is being carried out at that point and allows the CD-ROM decoder 5 to perform the next operation. In other words, by interrupting the current operation in response to the interrupt command, the control micro computer 7 may drive the transfer trigger generating circuit 22 to start the data transfer from the buffer RAM 6 to the host computer.

In this CD-ROM system, header information in each sector is repeatedly extracted and fed to the control micro computer 7. Based on the address information contained in the header information, a sector currently required by the host computer is detected.

However, various CD-ROM data formats, CD-ROM XA standard and Mode-2 format used in CD-I, employ an error detection/correction code not intended for the header. When using these formats, the header is not protected against errors at the stage of error correction by the CD-ROM decoder 5. Therefore, the header data reliability is inferior to the user data. To overcome this problem, the control micro computer 7 determines whether or not the header information is correct, with reference to the error flag transferred from the error flag register 15 and gives an operation command to the CD-ROM decoder 5 based on the determination.

However, in the control micro computer 7, since the determination of the accuracy of the header information and the detection of address information are carried out in parallel to the operation control for the analog signal processing unit 3 and digital signal processing unit 4, the load on the control micro computer 7 becomes heavy. Furthermore, when errors are contained in a header portion, inference of the correct information contained in the header portion is required, which further increases the burden to the control micro computer 7. Consequently, it becomes difficult to speed up the control operation of the control micro computer 7, which limits the amount of data that can be processed by the CD-ROM decoder 5.

SUMMARY OF THE INVENTION

Accordingly, it is an object of the invention to provide a CD-ROM decoder which is highly efficient and practical while reducing the operation control burden on the micro computer.

In accordance with this objective, a CD-ROM decoder according to the invention provides code error correction for digital data read out from a ROM disc and divided into a number of frames. The CD-ROM decoder includes an extracting circuit for extracting specific data having a predetermined regularity from the read out digital data in each of the sequential frames, an error detection circuit for detecting a presence of an error in the specific data for every frame, a correction data generating circuit for producing correction data for the extracted specific data by estimating data of at least one frame period later, based on the predetermined regularity of the data, and a selection circuit for outputting the correction data instead of the extracted specific data when an error is detected by the error detection circuit.

In this structure, when the predetermined regularity of the specific data is not detected, correction data is substituted and output to maintain the regularity of the data, irrespective of the command from the control micro computer. Consequently, correct sequential data is always output from the CD-rom decoder to the micro computer, thereby obviating the necessity of later error detection for the successive data. Thus, the burden on the control micro computer is decreased by an amount corresponding to an error correction operation for the header information.

The correction data generating circuit may include a first register for storing the extracted specific data, a processing circuit for providing constant processing of the stored specific data to estimate data of at least one frame period later, and a second register for storing the results of the processing for at least one frame period. The data stored in the second register is output as corrected data.

The error detection circuit may include a comparison circuit for comparing the data stored in the first register with the data stored in the second register every time data having a timing estimated in the correction data generating circuit is input to the first register, to determine whether or not these two data values coincide. Errors can be detected based on the comparison result.

The selection circuit outputs the data stored in the first register when the two data values coincide and outputs the data stored in the second register when the two data values do not coincide.

The error detection circuit may detect an error for every frame based on the state of an error flag which is borne on the digital data read out from the CD-ROM disc and shows the result of corrections made in the previous step, thereby assuring reliable error correction in response to the processing result of the previous step.

The error detection circuit may also detect an error by judging whether or not the value of the specific data is in an appropriate range.

In another aspect of the invention, a CD-ROM decoder is provided, which corrects code errors in digital data read out from a ROM disc and consisting of a number of frames and transfers the processed digital data to a host computer. The CD-ROM decoder includes an extract circuit for extracting address information defining an address location for each of the frames in the digital data read out, a target address memory for storing an address location of a particular frame as a target address, and a start trigger generating circuit for comparing the extracted address information with the stored target address and generating a start trigger when the two addresses coincide. In response to the start trigger, digital data transfer to the host computer begins.

The CD-ROM decoder may further include a counter for counting the number of frames of the read out digital data, and a stop signal generating circuit for generating a stop signal when the count value of the counter reaches a given value. In response to the stop signal, transfer of the digital data to the host computer is stopped.

In still another aspect, a CD-ROM decoder provides code error correction for digital data read out from the CD-ROM and divided into a number of frames and transfers the corrected digital data to a host computer. The CD-ROM decoder comprises a specific data detecting circuit for detecting specific data which is contained in each of sequential frames without fail, and an interrupt signal generating circuit for generating an interrupt signal when the specific data is not detected over a predetermined number of sequential frame periods. In response to the interrupt signal, transfer of the digital data to the host computer is stopped.

The specific data may be a synchronization signal representing a timing of the digital data. The specific data detecting circuit outputs a first timing signal when the synchronization signal is detected.

The interrupt signal generating circuit may include a first counter driven by the first timing signal and produces a second timing signal, or an estimation signal which is generated at a timing where the next synchronization signal is estimated to be detected, by counting a given number of clocks having a certain cycling period and calculating a time period during which one sector of CD-ROM data is input. The interrupt signal generating circuit may also include a second counter which is set to an initial value when the first timing signal coincide with the second timing signal, while advancing the count value when the two timing signals do not coincide and outputs an interrupt signal when the count value reaches a given value.

In another further aspect, a CD-ROM decoder for providing error correction for digital data read out from a ROM disc and divided into a number of frames and for transferring the corrected digital data to a host computer, comprises an extracting circuit for extracting specific data having a predetermined regularity from the read out digital data for each of sequential frames, an error detection circuit for detecting a presence of an error in the extracted specific data for every frame, and an interrupt signal generating circuit for generating an interrupt signal when an error is detected over a given number of sequential frames. In response to the interrupt signal, transfer of the digital data to the host computer is stopped.

The error detection circuit may include a first register for sequentially storing the extracted specific data, a processing circuit for providing constant processing of the specific data stored in the first register and for estimating specific data of at least one frame period after, a second register for storing the computing result obtained in the processing circuit, and a comparison circuit for comparing the specific data stored in the first register with the specific data stored in the second register at a timing estimated in the computing circuit. When the specific data in the first register does not coincide with that of the second register, an interrupt signal is output.

PREFERRED EMBODIMENTS

First Embodiment

Figure 4:
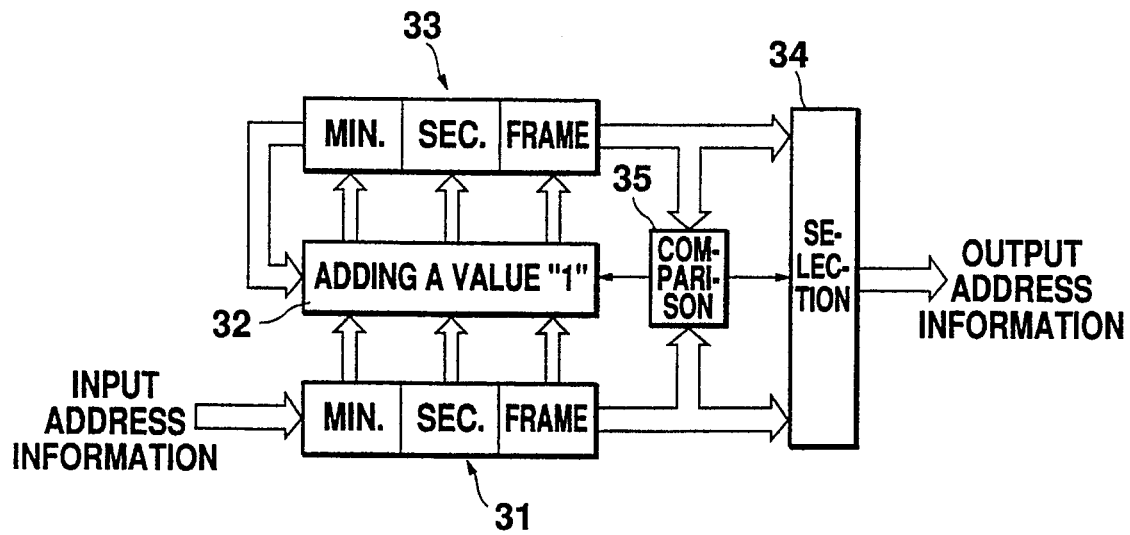
FIG. 4 is a block diagram showing a structure of an address information determination judging section according to the first embodiment of the invention.

FIG. 4 shows an address data judging section of a CD-ROM decoder in accordance with the first embodiment, which comprises an address information register 31, an adder 32, a final address information register 33, a selection circuit 34, and a comparison circuit 35.

The address information register 31 receives and stores three bytes of address data representing minutes (MIN), seconds (SEC) and frame number (FRAME) from among the four bytes of header information assigned for every sector of the CD-ROM data. The three bytes of address data are extracted by the descramble circuit 11 and supplied to the address information register 31. The address information is represented by binary coded decimal (BCD). The value of FRAME data causes an increment of the SEC data every 75 frames, and the value of SEC data causes an increment of the MIN data every 60 seconds (4,500 frames). One frame is equal to one sector (2352 bytes).

The adder 32 reads out address data from either the address information register 31 or the final address information register 33 and adds a value of 1 to the address data, which is then supplied to the final address information register 33. In this embodiment, a value of 1 is successively added to a frame number, and when the frame number reaches 74, it rolls to "0" and increments the SECOND value. That is, by the next addition of a value "1", the frame number "74" returns to "0" and a value "1" is added to the SECOND value. The SECOND value is incremented from "0" to "59", and by the next addition of a value "1", the SECOND value returns to "0" and a value "1" is added to the MINUTE value. The MINUTE value is incremented from "0" to "81", and by the next addition of a value "1", it returns to "0".

The final address information register 33 receives and stores address information output from the adder 32. When the address data from the adder 32 is taken into the final address information register 33, the next address information is supplied to the address information register 31. The selection circuit 34 receives both the address information read out from the address information register 31 and the final address information register 33, respectively, and selects one of them for output. This selection is made based on a control pulse supplied by the comparison circuit 35. The comparison circuit 35 also receives both address information output from the address information register 31 and the final address information register 33 and compares the two values to determine whether or not these two values coincide. In accordance with the comparison result, the comparison circuit 35 generates a control pulse, which is supplied to the selection circuit 34. When the two values of address information stored in the respective registers 31 and 33 coincide, address data read out from the address information register 31 is selected to be output. On the other hand, when the two addresses do not coincide, address data from the final address information register 33 is selected to be output. At the same time, a selection pulse is supplied to the adder 32. When the two address information values stored in the respective registers 31 and 33 coincide, the value from the address information register 31 is taken into the adder 32, and when these two do not coincide, address data from the final address information register 33 is taken into the adder 32.

Figure 5:
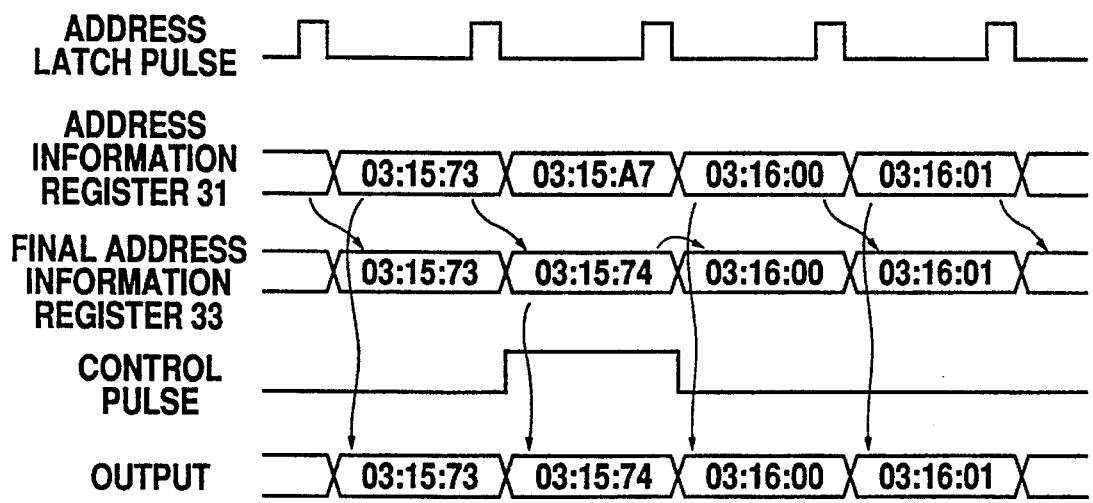
FIG. 5 is a timing chart showing operations of the address information judging section of FIG. 4.

Address data stored in the final address information register 33 is shifted by one sector from that in the address information register 31 at the same point in time. However, because of the addition of a value "1", the two values of address information stored in the respective registers 31 and 33 must coincide as long as there is no code error. When a code error occurs, data from the address information register 31 becomes discontinuous, while address data stored at the same time in the final address information register 33 is still continuous, resulting in differences between the address information in the two registers. For instance, as shown in FIG. 5, even if the data value stored in the address information register 31 presents a value of "03:15:A7", which was supposed to be "03:15:74", following a value of "03:13:73" due to a code error, the address information input to the final address information register 33 still maintains regularity and presents a correct value of "03:15:74", following a value of "03:15:73". When the address information read out from the respective register 31 and 33 do not coincide, the comparison circuit 35 determines that address data stored in the address information register 31 contains a code error, which makes the selection circuit 34 select and output the address information read out from the final address information register 33. Simultaneously, to maintain the regularity of the address data which is to be supplied next from the adder 32 to the final address information register 33, the address information in the final address information register 33 is taken into the adder 32 instead of the address information from the address information register 31. With reference to FIG. 5 again, in the case that data having a value "03:15:A7" is read out from the address information register 31 due to a code error, address information "03:15:74" stored in the final address information register 33 is taken into the adder 32 and a value "1" is added to it. As a result, the correct succeeding address information "03:16:00" is stored in the final address information register 33 without losing regularity.

In this manner, when input address information loses regularity due to a code error, a compensation address data produced based on the correct address information of one sector before, is alternatively output to maintain the regularity, and the code error is thus corrected.

Second Embodiment

Figure 6:
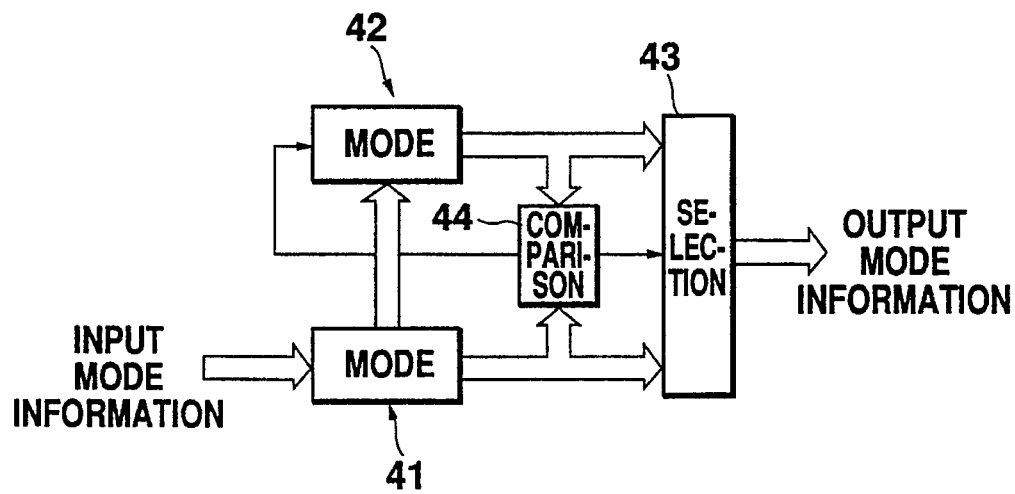
FIG. 6 is a block diagram showing a structure of a mode identification code judging section according to the second embodiment of the invention.

FIG. 6 shows a structure of a mode ID code judging section in a CD-ROM decoder in accordance with the second embodiment of the invention.

A mode information register 41 takes in and stores a one byte mode ID code defining the data format of the sector from the four bytes of header information. The mode ID code is for identifying whether the data format is Mode 1, having 8 bytes of unused area, or Mode 2, which has a subheader instead of such an unused area. At least for a certain area in the disc, the same mode ID code is assigned. The final mode information register 42 takes in and stores a mode ID code which has been read out from the mode information register 41. As the current mode ID code is read out from the mode information register 41, the next mode ID code is received at the mode information register 41. A selection circuit 43 receives both mode ID codes read out from the mode information register 41 and the final mode information register 42 and selects one of them for output. A comparison circuit 44 also receives both mode ID codes read out from the respective registers 41 and 42 and compares the two values to determine whether or not they coincide. In accordance with the comparison results, the comparison circuit 44 generates a selection control pulse, which is supplied to the selection circuit 43. When the mode ID codes stored in the respective registers 41 and 42 coincide, the mode ID code in the mode information register 41 is selected to be output. When they do not coincide, the mode ID code in the final mode information register 42 is selected to be output. At the same time, the selection control pulse is also fed to the final mode information register 42. When there is no match between the two mode ID codes, receipt of the mode ID code from the mode information register 41 is suspended.

Figure 7:
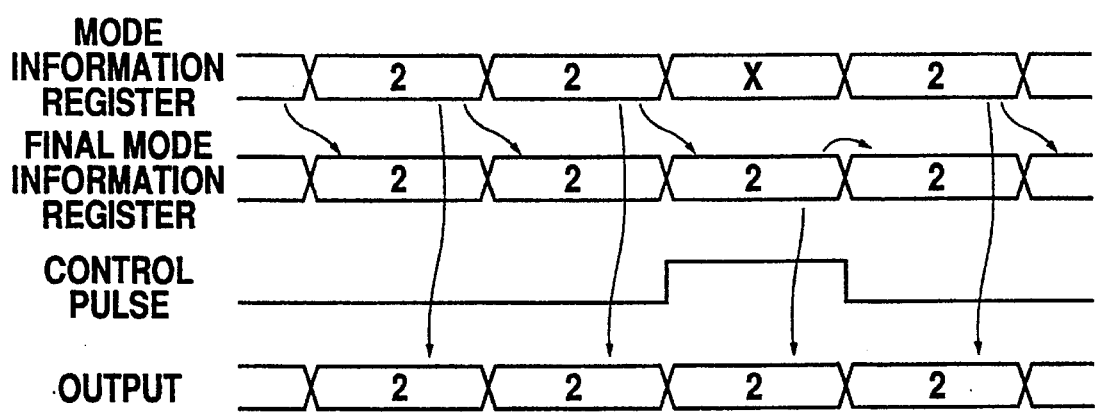
FIG. 7 is a timing chart showing operations of the mode identification code judging section of FIG. 6.

A mode ID code stored in the final mode information register 42 is shifted by one sector from that in the mode information register 41 at the same time. However, since the same mode ID code is repeated, the mode ID codes stored in the respective registers 41 and 42 coincide as long as no code error occurs. When the code error occurs, the mode ID code stored in the mode information register 41 presents a different value, while the mode ID code stored in the final mode information register 42 still maintains the same value, which results in differing mode ID code values in the respective registers 41 and 42. For example, as is shown in FIG. 7, even when the value of the mode ID code input to the mode information register 41 changes from "2" to "X" (X: any numerical value except for 2) due to a code error, the value of the mode ID code input to the final mode information register 42 remains a value "2". When the two mode ID codes read out from the respective registers 41 and 42 do not coincide, the comparison circuit 44 determines that the mode ID code stored in the mode information register 41 contains a code error, which makes the selection circuit 44 select the mode ID code read out from the final mode information register 42. Also, the mode ID code of the register 41 containing a code error is prevented from being taken into the final mode information register 42. Instead, the mode ID code which is the same as that of the preceding sector is maintained.

Thus, even when the input mode ID code presents a different value due to a code error, a mode ID code of the preceding sector is output from the final mode information register 42, instead of the incorrect mode ID code, thereby correcting the code error.

Third Embodiment

Figure 8:
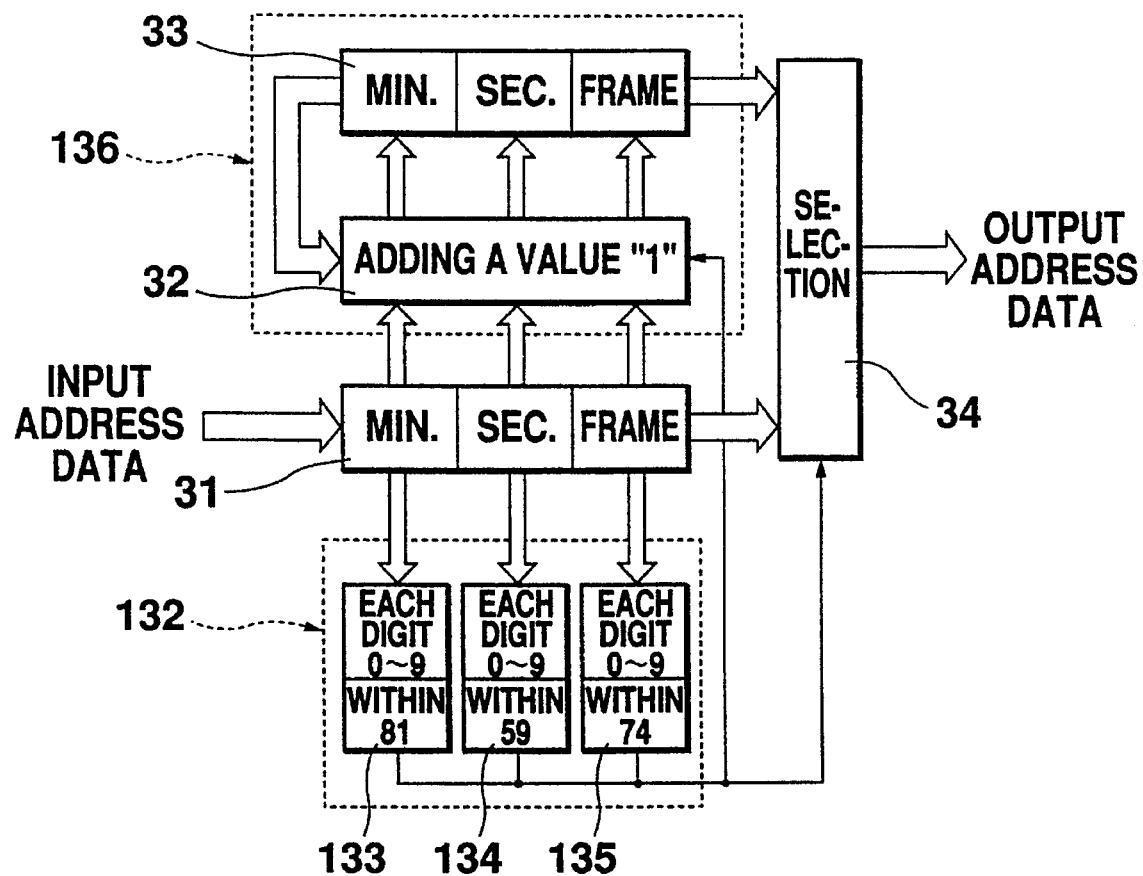
FIG. 8 is a block diagram showing a structure of an address information judging section according to the third embodiment of the invention.

FIG. 8 shows an address information judging section of a CD-ROM decoder in accordance with the third embodiment, which includes a range check circuit 132. The range check circuit 132 comprises three sections 133–135 (i.e. first to third check sections), to each of which one byte of address data representing minute, second and frame number are input, respectively. The first check section 133 checks address data representing "minutes" and determines whether each digit (4 bits) of the data value is within the range of 0–9. The first check section 133 also determines whether the value of the address data is within 81 minutes. When detecting an error in either of the checks, the first check section 133 issues an error detection output. Since the address information is represented by BCD and its value is set within the range of 0–81 minutes, it must not take such values as A–F as is used in hexadecimal and must not exceed 81 minutes. If the address data value contains FIGURES A–F (for example, such as "A7") or exceeds 81 (e.g. "94"), the check section 133 determines that an error occurs. Similarly, the second and third check sections 134 and 135 check the associated address data representing seconds and frame numbers, respectively, and determine whether each digit is within 0–9 and whether the values of address information are within 59 seconds and within 74 frames, respectively. If an error is detected in either of the checks, error detection output is issued. The detection outputs from each of the check sections 133–135 are composed to produce a control pulse, which is output from the range check circuit 132, for indicating that one of the check sections 133–135 detects an error.

The address information section 136 comprises the final address information register 33 and the adder 32. Similar to the first embodiment, the adder 32 adds a value "1" to address data read out from the address information register 31 and produces incremented address data, which is fed to and stored in the final address information register 33. In response to the output from the range check circuit 132, either the address data stored in the address information register 31 or the final address information register 33 is taken into the adder 32. The selection circuit 34 receives address information from both the address information register 31 and final address information register 33, then selects and outputs one of them in response to the control pulse output from the range check circuit 132.

If the range check circuit 132 does not detect a code error in address information, it gives a command to the selection circuit 34 to select address data read out from the address information register 31. At the same time, the range check circuit 132 also gives a command to the adder 32 to take in the address data read out from the address information register 31. Thus, when there is no code error found in the address information, address data stored in the address information register 31 is output from the selection circuit 34 as it is. When the range check circuit 132 detects a code error, it gives a command to the selection circuit 34 to select address data read out from the final address information register 33. Accordingly, even when a range error is contained in the address information stored in the address information register 31, the address data stored in the final address information register 33 is selected to be output, thereby maintaining the regularity of the sequential address information.

Fourth Embodiment

Figure 3:
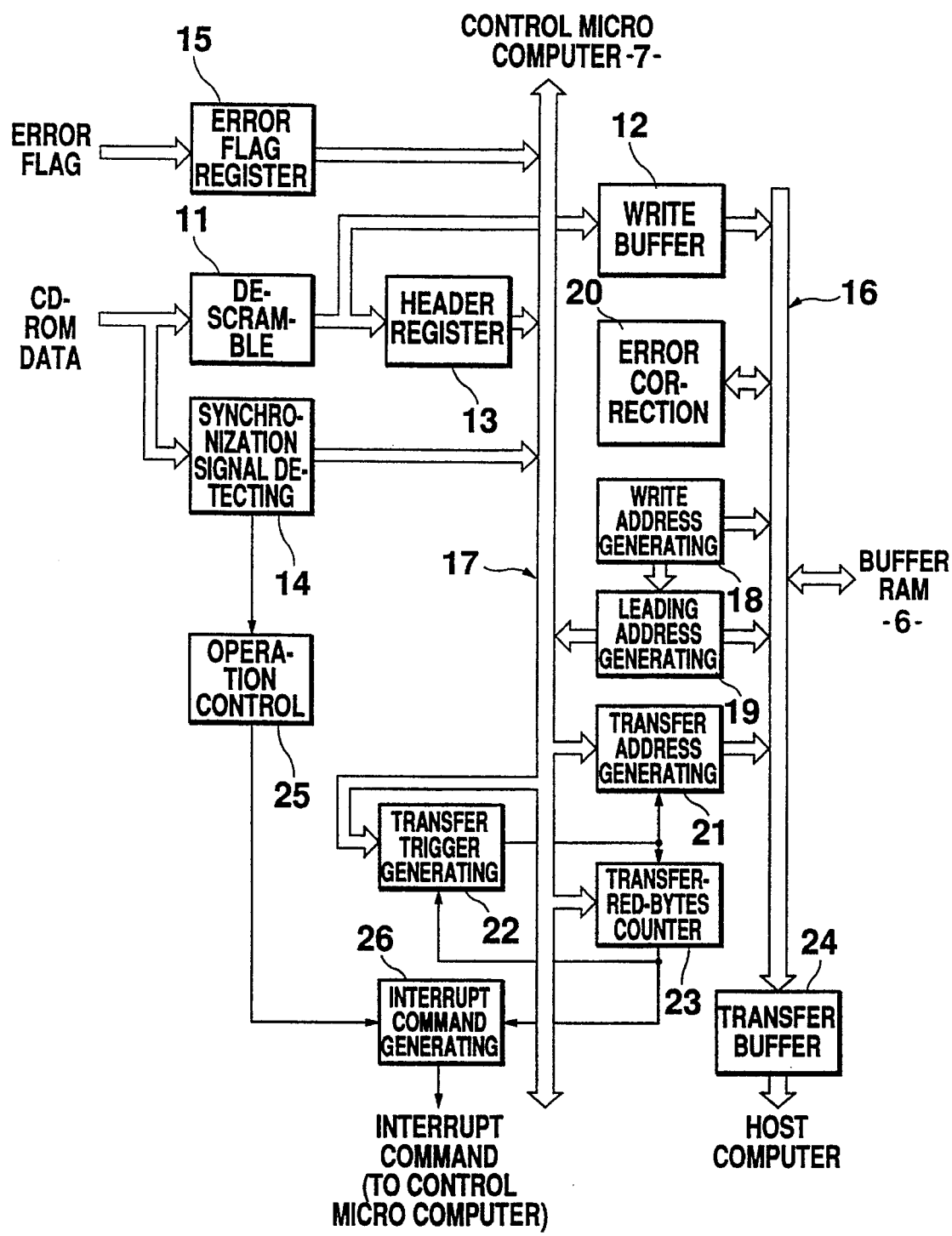
FIG. 3 is a block diagram showing a conventional CD-ROM decoder.
Figure 9:
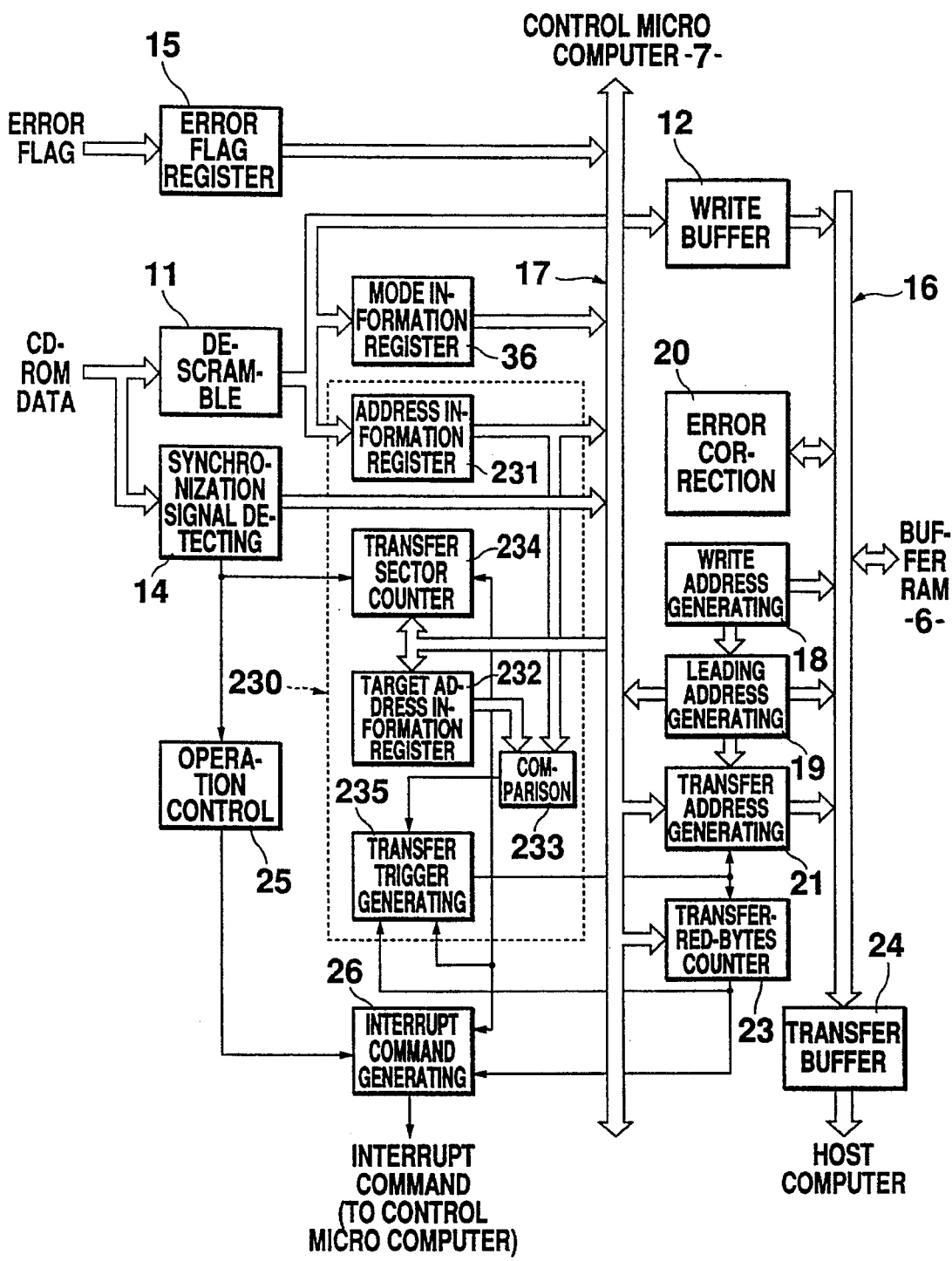
FIG. 9 is a block diagram showing a structure of an address information judging section according to the fourth embodiment of the invention.

FIG. 9 shows a structure of a CD-ROM decoder in accordance with the fourth embodiment, in which elements such as a descramble circuit 11, an error correction circuit 20, etc. are the same as those in FIG. 3 and are denoted by the same numerals, except for the address information judging section 230 for extracting address data.

The address information judging section 230, which finds a desired sector based on address information of the CD-ROM data, comprises an address information register 231, a target address information register 232, a comparison circuit 233, a transferred-sector counter 234, and a transfer trigger generating circuit 235. The address information register 231 extracts header address information for every sector of CD-ROM data which has been subjected to the descramble processing and feeds the header address information to the second data bus 17.

As has been described, address information is three bytes of information indicated by binary coded decimal, each byte representing minutes, seconds and frame numbers, respectively. The SECOND value is incremented every 75 frames, and the MINUTE value is incremented every 60 seconds (4500 frames). The target address information register 232 receives and stores target address information and repeatedly outputs it. Target address information, which indicates an address of a leading sector to which data must be transferred based on the command from the host computer, is supplied by the control micro computer 7 via the second data bus 17 to the target address information register 232 in response to a command from the host computer.

The comparison circuit 233 compares address data read out from the address information register 231 with target address data read out from the target address information register 232 and generates a start pulse when they coincide. The transferred-sector counter 234 is loaded with transferred-sector information data representing a number of sectors which are to be transferred as preset information and then decrements (counts down) the sector number every time one sector of CD-ROM data is input, in response to a timing signal output from the synchronization signal detecting circuit 14. When the count value reaches an initial value, the transferred-sector counter 234 generates a stop pulse. The transfer trigger generating circuit 235 gives a transfer start command to both the transfer address generating circuit 21 and transferred-byte counter 23, in response to a generation of a start pulse, and gives a transfer stop command to the transfer address generating circuit 21 in response to the generation of a stop pulse. The stop pulse is also supplied to the interrupt command generating circuit 26 which feeds an interrupt command to the host computer when the transfer of a given number of sectors of data is completed. The mode information register 36, which is arranged in parallel to the address information register 231, takes in a mode ID code of CD-ROM data output from the descramble circuit 11 and transfers the mode ID code via the second data bus 17 to the control micro computer 7.

Figure 10:
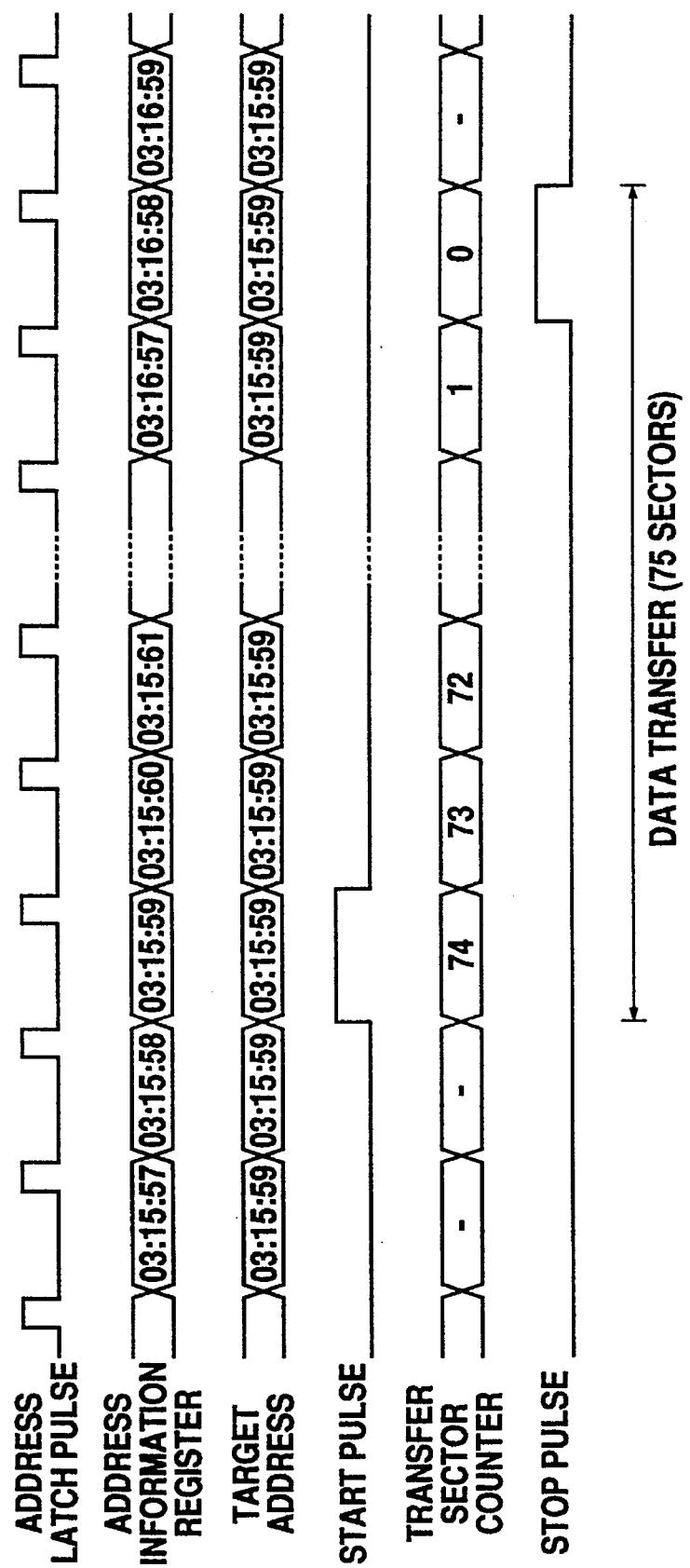
FIG. 10 is a timing chart showing operations of the address information judging section of FIG. 9.

In the address information judging section 230, once target address information and transferred-sector information are set, operations are sequentially carried out without a command from the control micro computer 7 until a given number of sectors of CD-ROM data are input and completely transferred to the host computer. For example, supposing that 75 sectors of CD-ROM data are to be transferred beginning from a sector having an address "03:15:59". As is shown in FIG. 10, target address information "03:15:59" is stored in the target address information register 232, and at the same time, transferred-sector information having a value "74" is set in the transferred-sector counter 234. When the value of address data which is sequentially taken into the address information register 231 reaches "03:15:59", the comparison circuit 233 detects a match between the address information and the target address information and issues a start pulse. In response to the start pulse, the transfer trigger generating circuit 235 supplies a transfer start command to the transferred-address generating circuit 21, and the transfer bytes counter 234 starts to count down the value. When the count value reaches "0", a stop pulse is generated. In response to the pulse, the transfer trigger generating circuit 235 gives a transfer stop command to the transfer address generating circuit 21. At the same time, the interrupt command generating circuit 26 feeds an interrupt command to the control micro computer 7 in response to the generation of the stop pulse. In this manner, 75 sectors of successively input CD-ROM data, with a sector having an address "03:15:59" as a leading sector, are transferred from the transfer buffer 24 to the host computer. During this operation, the control micro computer 7 is not involved in the address judging, and therefore, is able to perform other control operations.

Fifth Embodiment

Figure 11:
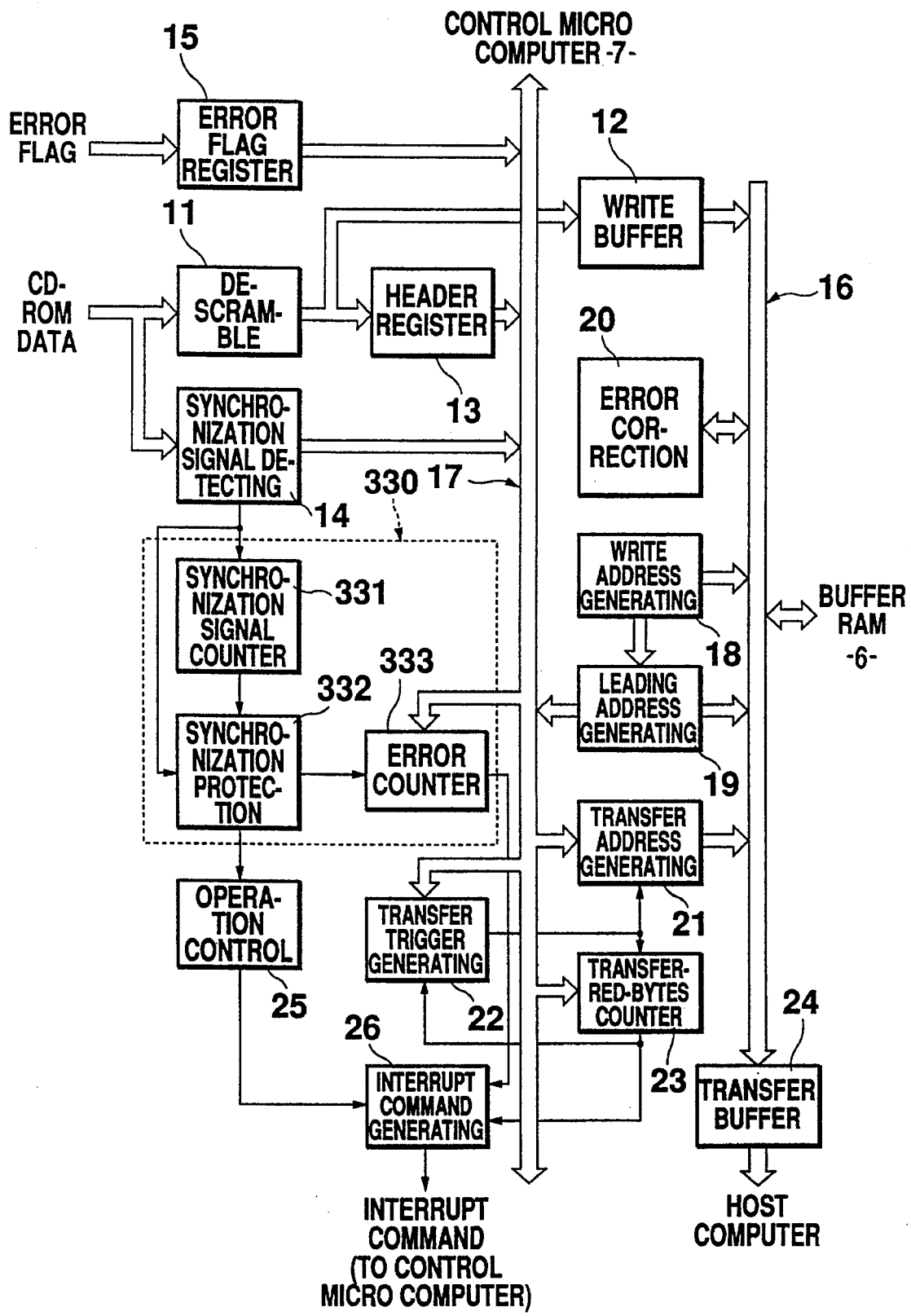
FIG. 11 is a block diagram showing a structure of a CD-ROM system according to the fifth embodiment of the invention.

FIG. 11 shows a structure of a CD-ROM decoder in accordance with the fifth embodiment, in which elements such as a descramble circuit 11, an error correction circuit 20, etc. are the same as those in FIG. 3 and are denoted by the same numerals, except for the detection confirmation section 330 for confirming detection of synchronization signals.

The detection confirmation section 330, which determines, based on a timing signal output from the synchronization signal detection circuit 14, whether a synchronization signal contained in CD-ROM data is correctly detected, comprises a synchronization signal counter 331, a synchronization protecting circuit 332, and an error counter 333.

The synchronization signal counter 331 is motivated by a timing signal supplied from the synchronization signal detection circuit 14 and produces an estimation signal which is generated at a timing where when the next synchronization signal is estimated to be detected by counting a given number of clocks having a certain cycling period and calculating a time period during which one sector of CD-ROM data is input. When completing the generation of the estimation signal, the synchronization signal counter 331 is cleared to "0", and the counting is repeated.

The synchronization protecting circuit 332 receives a timing signal from the synchronization signal detection circuit 14 as well as an estimation signal generated by the synchronization signal counter 331. When the two signals coincide, the synchronization protecting circuit 332 outputs the timing signal, whereas when the two signals do not coincide, it outputs the estimation signal instead of the timing signal. Thus, even when the synchronization signal is not correctly detected by the synchronization signal detection circuit 14, a timing signal is regularly supplied to the operation control circuit 25 by replacing the error timing signal with an estimation signal. When the timing signal does not coincide with the estimation signal, the synchronization protecting circuit 332 generates a detection error signal showing that a synchronization signal has not been detected, which is supplied to the error counter 333.

In response to the detection error signal, the error counter 333 starts counting after being loaded with preset data. When the counting value reaches a given value, a stop command is generated and supplied to the interrupt command generating circuit 26. The preset data loaded in the error counter 333 determines when the stop command will be generated based on the number of successive sectors in which an error in the synchronization signal is detected. An arbitrarily changeable value is supplied to the error counter 333 from the control micro computer 7 as preset data. In the case that the preset data is fixed data, a register storing the fixed data may be added to the error counter as a supply source of the fixed data, which can omit the preset data supply operation of the control micro computer 7.

Figure 12:
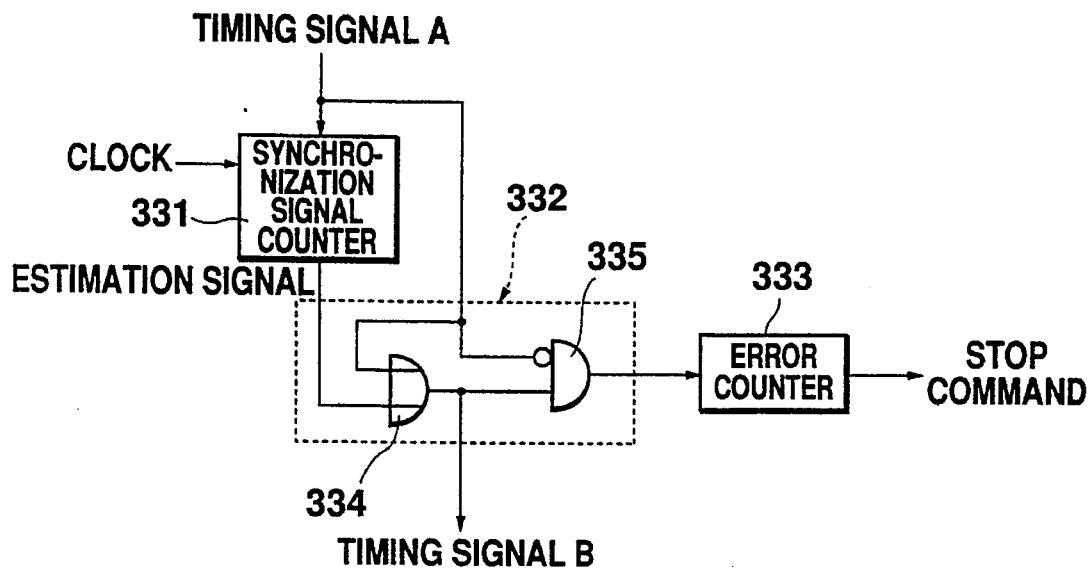
FIG. 12 is a block diagram showing a structure of a synchronization protecting circuit according to the fifth embodiment.
Figure 13:
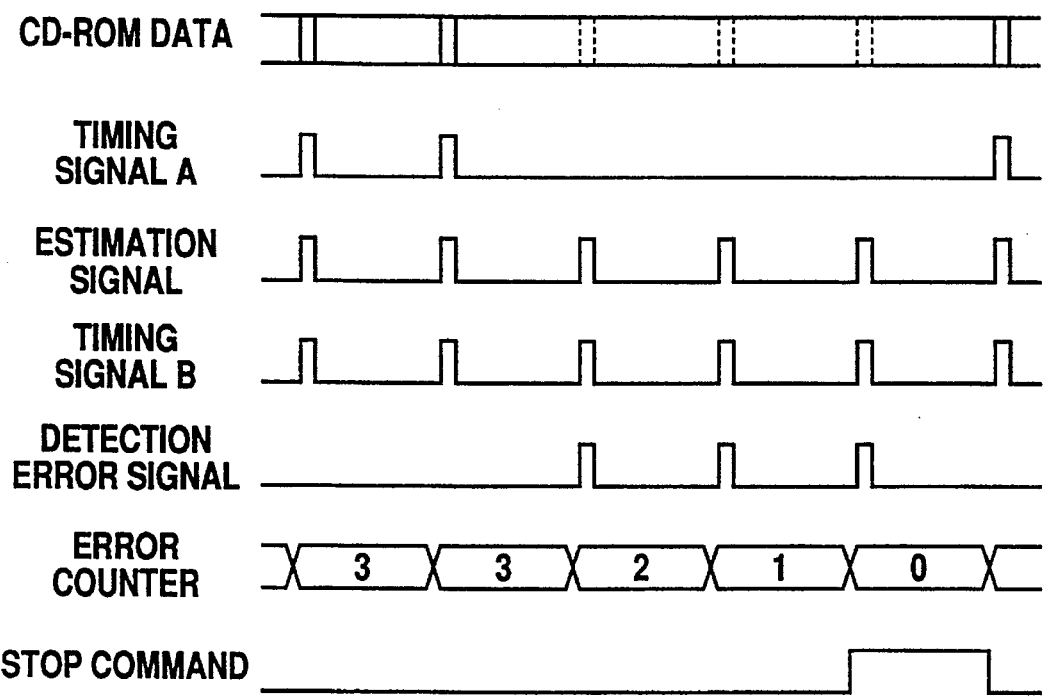
FIG. 13 is a timing chart showing operations of the synchronization protecting circuit of FIG. 12.

A structural example of the synchronization protecting circuit 332 is shown in FIG. 12, and operation timings are shown in FIG. 13.

The synchronization protecting circuit 332 comprises, for example, an OR gate 334 and an AND gate 335. A timing signal A from the synchronization signal detection circuit 14 and an estimation signal from the synchronization signal counter 331 are input to the OR gate 334 which outputs a synchronized timing signal B. An inverted signal of the timing signal A and an output from the OR gate 334 are input to the AND gate 335, which then generates a detection error signal.

More particularly with reference to FIG. 13, when the synchronization signal detection circuit 14 does not detect a synchronization signal, there is no pulse rise in the timing signal A. However, since the estimation signal maintains a pulse rise at every given cycling period, the timing signal B obtained from the OR 334 gate can also maintain a constant pulse rise. Thus, even when the synchronization signal detection circuit 332 does not detect a synchronization signal, a timing signal B is supplied by the synchronization protecting circuit 332, which can provide an effect equal to that where the synchronization signal is detected. When the timing signal A and the timing signal B do not coincide, that is, when a detection error occurs in the detection of a synchronization signal, a detection error signal is generated at a time that is in correspondence with the timing signal B, which decrements the error counter 333.

Now in the case where it is desirable to generate a stop command when a synchronization signal is not detected for three successive sectors,then preset data having a value "3" is loaded in the error counter 333. The error counter 333 starts counting down when a detection error occurs, which is when there is an output from the AND gate. When the count value reaches "0", a stop command is generated. In the case that the synchronization signal is not detected for only one or two successive sectors, no stop command is generated, and a substitution is made for the missed pulse. When the detection error successively occurs for more than three sectors, a stop command is supplied to the interrupt command generating circuit 26.

In this manner, when a synchronization signal detection error successively occurs over a given number of sectors, the transfer of CD-ROM data is suspended in the CD-ROM decoder 5. Under these circumstances, the control micro computer 7 controlling the operation of the CD-ROM decoder 5 needs not perform confirmation of the detection of synchronization signals.

Sixth Embodiment

Figure 14:
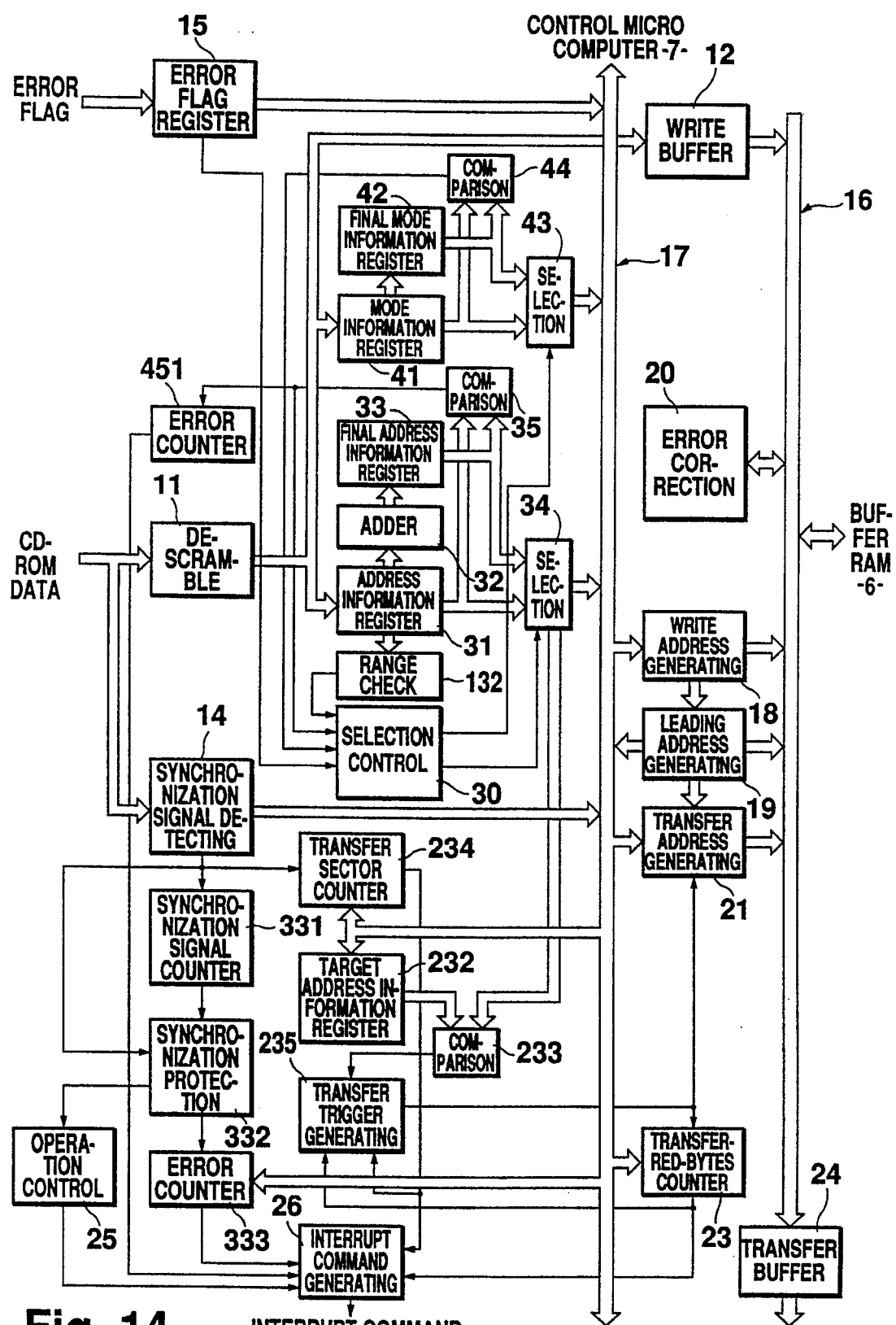
FIG. 14 is a block diagram showing a structure of a CD-ROM decoder according to the sixth embodiment.

FIG. 14 shows a structure of a CD-ROM detector in accordance with the sixth embodiment. The CD-ROM detector includes an address information register 31, an adder 32, a final address information register 33, a selection circuit 34, and a comparison circuit 35, which are the same as those in the first embodiment. A comparison result of the comparison circuit 35 is supplied to the selection control circuit 30 which controls a selecting operation of the selection circuit 34 in accordance with the comparison result.

The CD-ROM decoder also includes a mode information register 41, a final mode information register 42, a selection circuit 43, and a comparison circuit 44, which were described in connection with the second embodiment. A comparison result of the comparison circuit 44 is supplied to the selection control circuit 30 which controls a selection made in the selection circuit 43.

The CD-ROM decoder further includes a range check circuit 132 described in the third embodiment, and a check result is supplied to the selection control circuit 30 which controls a selecting operation of the selection circuit 34.

The CD-ROM decoder still further includes a target address information register 232, a comparison circuit 233, a transferred-sector counter 234, and a transfer trigger generating circuit 235. When address data supplied from the selection circuit 34 matches the target address information, a transfer start command is generated. When the number of transferred sectors reaches a value equal to the transferred-sector information, a transfer stop command is generated.

The CD-ROM decoder also includes a synchronization signal counter 331, a synchronization protection circuit 332, and an error counter 333. Accordingly, even when a detection error of the synchronization signal occurs, an estimation signal is supplied to the synchronization protection circuit 332 and a timing signal is fed to the operation control circuit 25. When a detection error occurs continuously for a given number of successive sectors, the error counter 333 supplies a stop command to the interrupt command generating circuit 26.

Figure 1:
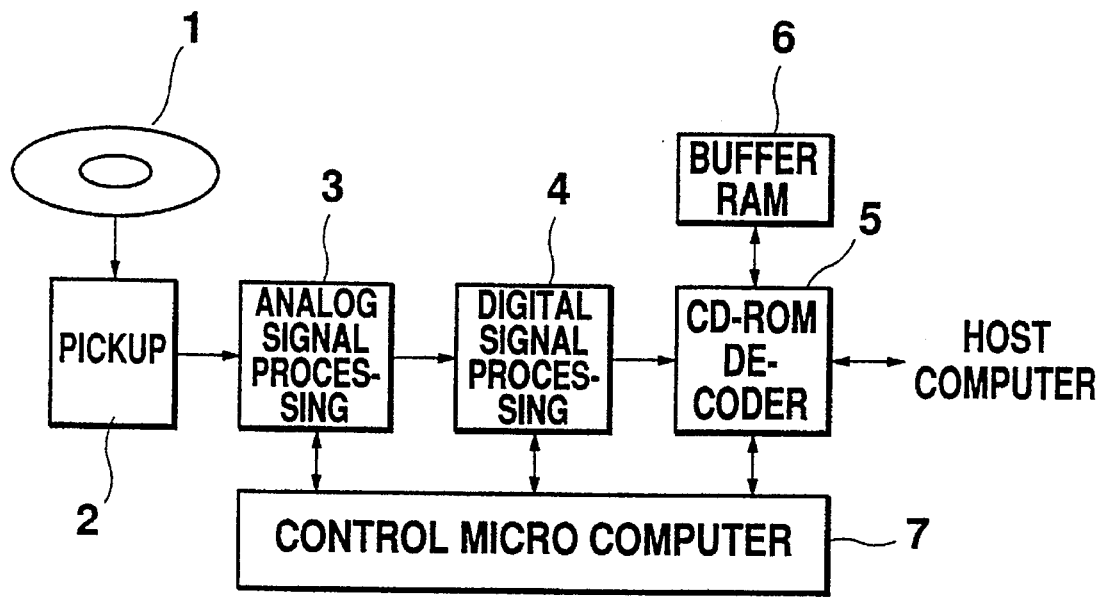
FIG. 1 illustrates a structure of a conventional CD-ROM system.
Figure 2:
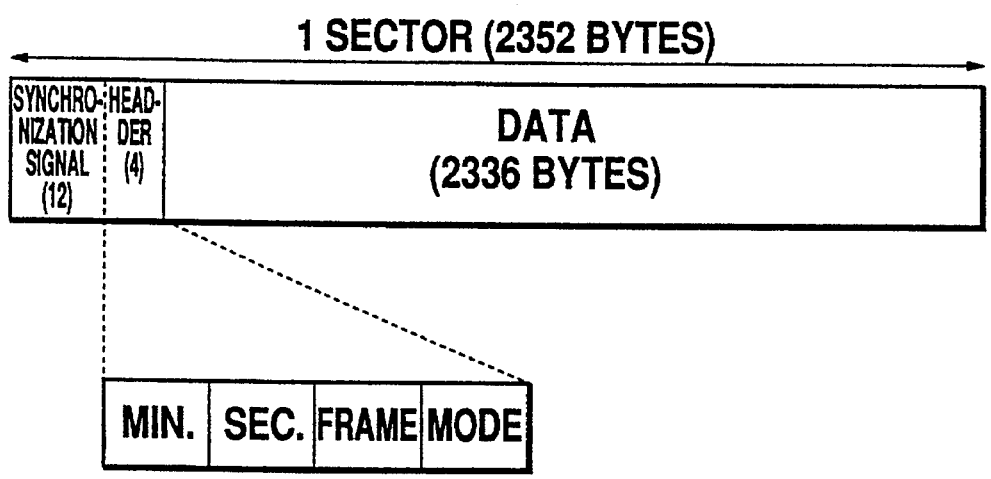
FIG. 2 illustrates a typical data format for a sector of conventional CD-ROM data.

An error flag register 15 is also included in the CD-ROM decoders, which stores an error flag supplied from the digital signal processing unit 4 (see FIG. 1) arranged before the CD-ROM decoder. The error flag indicates whether or not any errors are left uncorrected in the previous error correcting operation in the digital signal processing unit 4. In the case that such an error flag is set, there is a high possibility that errors are contained in the header data. Therefore, in this embodiment, whether or not the error flag is set is checked for every frame to control an output of address information.

A control signal indicating whether or not an error flag is set is input to the selection control circuit 30 from the error flag register 15. Based on the signal condition, the selection control circuit 30 determines whether or not the frame contains an error. When the error flag is set, the selection control circuit 30 controls the selection circuits 34 and 43 to select and output address information from the final address information register 33 and a mode ID code from the final mode register 42, respectively, to the second data bus 17. When the error flag is reset, the selection control circuit 30 controls the selection circuits 34 and 43 to select and output address information from the address information register 31 and a mode ID code from the mode register 41, respectively, to the second bus 17. By using the control signal, it may be possible to separately control the respective selection circuits 34 and 43. The selection control in accordance with the control signal from the error flag register 15 may precede all other selection control jobs.

Further, a control pulse from the comparison circuit 35 is input to the error counter 451, in which preset data has been loaded, and allows the error counter 451 to perform a counting operation. The error counter 451 is the same as the error counter 333 employed in the fifth embodiment. After being loaded with preset data having a given value, it counts a control pulse supplied from the comparison circuit 35, and when the counting value reaches a given value, it generates a stop command which is to be supplied to the interrupt command generating circuit 26.

Figure 15:
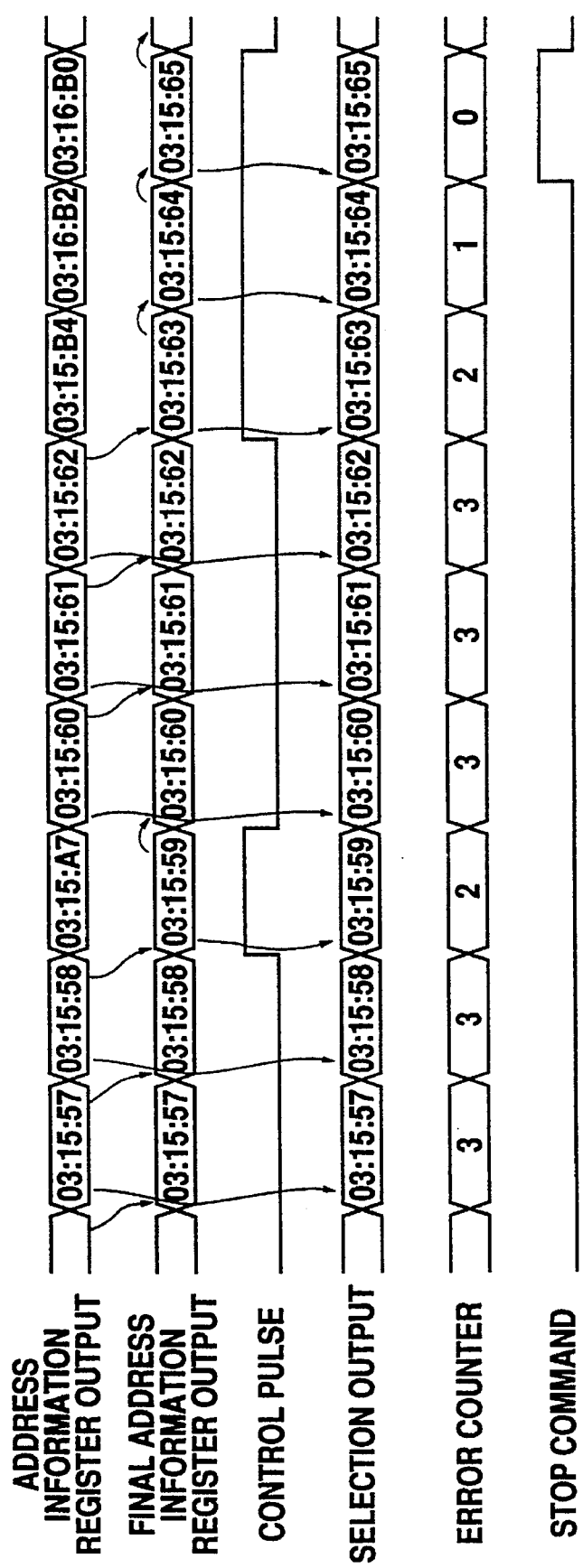
FIG. 15 is a timing chart showing operations of the CD-ROM decoder of FIG. 14.

FIG. 15 shows an example of operation timings. In this example, address information input to the address information register 31 presents a value "03:15:A7" due to a code error, which is supposed to be "03:15:59", following a value "03:15:58". On the other hand, address information input to the final address information register 33 presents a correct value "03:15:59, and regularity is maintained. When the two items of address information read out from the respective register 31 and 33 do not coincide, it is judged in the comparison circuit 35 that the address information stored in the address information register 31 contains an error, which makes the selection circuit 34 select the address information read out from the final address information register 33. At the same time, the comparison circuit 35 makes the error counter 451 count down. As a result, the counting value decreases by a value "1" from the preset value.

If it is desired that a stop signal be generated when a code error is contained for three successive sectors, preset data having a value "3" is loaded into the error counter 451, which is decremented whenever there is a pulse rise in the comparison circuit 35. When the counting value reaches "0", a stop command is generated. Accordingly, when address information contains a code error for two or less successive sectors, the errors are corrected without the generation of a stop pulse, whereas when code errors continue for three or more successive sectors, a stop command is supplied to the interrupt command generating circuit 26.

In this manner, when the error correction continues over several sectors, CD-ROM data transfer is suspended in the CD-ROM decoder. During this operation, the control micro computer 7 for controlling operations of the CD-ROM decoder does not take part in the judging of address information and can conduct other control operations.

What is claimed is:

1. A CD-ROM decoder for correcting a code error in digital data read out from a ROM disc and divided into frames and for transferring the error-corrected digital data to a host computer, the CD-ROM decoder comprising:

a specific data detection circuit for detecting specific data assigned for every frame among the digital data, the specific data is a synchronization signal representing a timing of the digital data, wherein the specific data detection circuit generates a first timing signal when detecting the synchronization signal; and an interrupt signal generating circuit for generating an interrupt signal when the specific data is not detected for a given number of sequential frames, thereby stopping the digital data transfer to the host computer in response to the interrupt signal, wherein the interrupt signal generating circuit includes a first counter for receiving the first timing signal from the specific data detection circuit, the first counter is motivated by the first timing signal and counts a time period of one frame period to generate a second timing signal at a time when the next synchronization signal is estimated to be detected, and a second counter, which is reset to an initial value when the first and second timing signals match and advances a count value when the two timing signals do not match, thereby generating the interrupt signal when the count value of the second counter reaches a given value.

2. A CD-ROM decoder for correcting a code error in digital data read out from a ROM disc and divided into frames and for transferring the error-corrected digital data to a host computer, the CD-ROM decoder comprising:

an extracting circuit for extracting specific data having a given regularity over each of a plurality of sequential frames from the digital data;

an error detection circuit for receiving the specific data from the extracting circuit and detecting a presence of an error in the specific data extracted by the extracting circuit out of each of the plurality of sequential frames an interrupt signal generating circuit for receiving a signal from the error detection circuit indicating the presence of the error and generating an interrupt signal when the presence of the error is continuously detected by the error detection circuit for a given number of sequential frames, thereby stopping the digital data transfer to the host computer in response to the interrupt signal.

3. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data;

a correction data generating circuit for receiving the specific data from the extracting circuit and producing correction data by estimating a value of data in at least one frame period following the frame period of the specific data based on the predetermined regularity;

an error detection circuit for receiving the specific data from the correction data generating circuit and detecting a presence of an error in the specific data for each of the sequential frames;

a selection circuit for receiving the specific data and the correction data from the correction data generating circuit and selecting and outputting the correction data instead of the specific data when the presence of the error is detected by the error detection circuit.

4. The CD-ROM decoder according to claim 1, wherein the error detection circuit detects the error by determining whether or not the specific data maintains the predetermined regularity with respect to data in at least one frame period preceding the frame period of the specific data.

5. The CD-ROM decoder according to claim 4, wherein the error detection circuit determines whether or not the specific data maintains the predetermined regularity by comparing the specific data with the correction data generated by the correction data generating circuit.

6. The CD-ROM decoder according to claim 1, wherein the error detection circuit detects the presence of the error by determining whether or not the specific data extracted by the extracting circuit is within a proper range.

7. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data;

an error detection circuit for detecting a presence of an error in the specific data for each of the plurality of sequential frames, wherein the error detection circuit detects the presence of the error based on a condition of an error flag assigned to the digital data read out from the ROM disc;

a correction data generating circuit for receiving the specific data and producing correction data by estimating a value of data in at least one frame period following the frame period of the specific data based on the predetermined regularity;

a selection circuit for receiving the specific data and the correction data from the correction data generating circuit and selecting and outputting the correction data instead of the specific data when the presence of the error is detected by the error detection circuit.

8. The CD-ROM decoder according to claim 7, wherein the correction data generating circuit includes a first register for storing the specific data, a processing circuit for providing constant processing on the specific data stored in the first register to estimate a value of data in at least one frame period following the frame period of the specific data based on the predetermined regularity, and a second register for storing a processing result of the processing circuit for at least one frame period, the processing result stored in the second register being output as the correction data.

9. A CD-ROM decoder for correcting a code error in digital data read out from a ROM disc and transferring the error-corrected digital data to a host computer, the CD-ROM decoder comprising:

an extracting circuit for extracting specific data having a given regularity over a plurality of sequential frames from the digital data;

an error detection circuit for receiving the specific data from the extracting circuit and detecting a presence of an error in the specific data extracted by the extracting circuit out of each of the plurality of sequential frames, wherein the error detection circuit comprises a first register for sequentially storing the specific data extracted by the extracting circuit, a processing circuit for providing constant processing to the specific data stored in the first register to estimate a value of data in at least one frame period following the frame period of the specific data, a second register for storing a processing result of the processing circuit, and a comparison circuit for comparing the specific data from the first register with the processing result from the second register at a timing estimated by a computing circuit, and detecting the presence of the error based on a comparison result of the comparison circuit an interrupt signal generating circuit for receiving a signal from the error detection circuit indicating the presence of the error and generating an interrupt signal when the presence of the error is continuously detected by the error detection circuit for a given number of sequential frames, thereby stopping the digital data transfer to the host computer in response to the interrupt signal.

10. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data; and a correction data generating circuit for receiving the specific data and producing correction data by estimating a value of data in at least one frame period following the frame period of the specific data based on the predetermined regularity, wherein the correction data generating circuit includes a first register for storing the specific data, a processing circuit for providing constant processing on the specific data stored in the first register to estimate the value of the data in at least one frame period following the frame period of the specific data based on the predetermined regularity, and a second register for storing a processing result of the processing circuit for at least one frame period, the processing result stored in the second register being output as the correction data; and an error detection circuit for receiving the specific data from the first register and the correction data from the second register and detecting a presence of an error in the specific data for each of the sequential frames; and a selection circuit for receiving the specific data from the first register, the correction data from the second register, and a result of the error detection circuit, and selecting and outputting the correction data instead of the specific data when the result of the error detection circuit indicates the presence of the error.

11. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data;

a correction data generating circuit for receiving the specific data from the extracting circuit and producing correction data by estimating a value of data in at least one frame period following the frame period of the specific data based on the predetermined regularity, wherein the correction data generating circuit includes a first register for storing the specific data, a processing circuit for providing constant processing on the specific data stored in the first register to estimate the value of the data in at least one frame period following the frame period of the specific data based on the predetermined regularity, and a second register for storing a processing result of the processing circuit for at least one frame period, the processing result stored in the second register being output as the correction data;

an error detection circuit for receiving specific data from the first register and the correction data from the second register and detecting a presence of an error in the specific data for each of the plurality of sequential frames, wherein the error detection circuit detects the presence of the error by determining whether or not the specific data extracted by the extracting circuit is within a proper range; and a selection circuit for receiving the specific data from the first register, the correction data from the second register, and a result of the error detection circuit, and selecting and outputting the correction data instead of the specific data when the result of the error detection circuit indicates the presence of the error.

12. A CD-ROM decoder for correcting a code error in digital data read out from a ROM disc and divided into frames, the CD-ROM decoder comprising:

an extracting circuit for extracting specific data having a predetermined regularity for each of a plurality of sequential frames the digital data; and a correction data generating circuit for receiving the specific data from the extracting circuit and producing correction data by estimating a value of data in at least one frame period following the frame period of the specific data based on the predetermined regularity, wherein the correction data generating circuit includes a first register for sequentially replacing and storing the specific data for each of the plurality of sequential frames and a second register for receiving and storing, for at least one frame period, the specific data from the first register, data stored in the second register being output as the correction data; and an error detection circuit for receiving the specific data from the first register and the correction data from the second register and detecting a presence of an error in the specific data for each of the plurality of sequential frames, wherein the error detection circuit includes a comparison circuit for comparing the specific data from the first register with the correction data from the second register every time the specific data is input to the first register, wherein the error detection circuit determines whether or not the specific data matches with the correction data, the presence of the error being detected based on a comparison result of the comparison circuit; and a selection circuit for receiving the specific data from the first register, the correction data from the second register, and the comparison result from comparison circuit, and selecting and outputting the correction data instead of the specific data when the presence of the error is detected by the error detection circuit, wherein the selection circuit selects and outputs the specific data stored in the first register when the comparison result is a match and selects and outputs the correction data from the second register when the comparison result is not a match.

13. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data; and a correction data generating circuit for receiving the specific data from the extracting circuit and producing correction data by estimating a value of data in at least one frame period following the frame period of the specific data based on the predetermined regularity, wherein the correction data generating circuit includes a first register for sequentially replacing and storing the extracted specific data for each of the plurality of sequential frames and a second register for receiving and storing, for at least one frame period, the specific data stored in the first register, data stored in the second register being output as the correction data; and an error detection circuit for receiving the specific data from the first register and the correction data from the second register and detecting a presence of an error in the specific data for each of the plurality of sequential frames, wherein the error detection circuit detects the presence of the error by determining whether or not the specific data maintains the predetermined regularity with respect to data in at least one frame preceding the frame period of the specific data, wherein the error detection circuit determines whether or not the specific data maintains the predetermined regularity by comparing the specific data with the correction data generated by the correction data generating circuit, wherein the error detection circuit includes a comparison circuit for comparing the specific data from the first register with the correction data from the second register every time the specific data is input to the first register and for determining whether or not the specific data matches with the correction data, the presence of the error being detected based on a comparison result of the comparison circuit; and a selection circuit for receiving specific data from the first register, the correction data from the second register, and the comparison result from the error detection circuit and selecting and outputting the correction data instead of the specific data when the presence of the error is detected by the error detection circuit, wherein the selection circuit selects and outputs the specific data from the first register when the comparison result is a match, and outputs the correction data from the second register when the comparison result is not a match.

14. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data; and a correction data generating circuit for receiving the specific data from the extracting circuit and producing correction data by estimating a value of data in at least one frame period following the frame period of the specific data based on the predetermined regularity, wherein the correction data generating circuit includes a first register for storing the specific data, a processing circuit for providing constant processing on the specific data stored in the first register to estimate the value of the data in at least one frame period following the frame period of the specific data, and a second register for storing a processing result of the processing circuit for at least one frame period, and outputting the processing result stored in the second register as the correction data; and an error detection circuit for receiving the specific data from the first register and the correction data from the second register and detecting a presence of an error in the specific data for each of the plurality of sequential frames, wherein the error detection circuit includes a comparison circuit for comparing the specific data from the first register with the correction data from the second register every time the specific data is input to the first register at a timing estimated by the correction data generating circuit, wherein the error detection circuit generates a comparison result by determining whether or not the specific data matches with the correction data, the error detection circuit detects the presence of the error based on the comparison result; and a selection circuit for receiving the specific data from the first register, the correction data from the second register, the comparison result from the error detection circuit, and selecting and outputting the correction data instead of the extracted specific data when the presence of the error is detected by the error detection circuit, wherein the selection circuit selects and outputs specific data from the first register when the comparison result is a match and selects and outputs the correction data from the second register when the comparison result is not a match.

15. A CD-ROM decoder for correcting a code error in digital data read out from a ROM disc and divided into frames, the CD-ROM decoder comprising:

an extracting circuit for extracting specific data having a predetermined regularity for each of a plurality of sequential frames from the digital data;

a correction data generating circuit for receiving the specific data from the extracting circuit and producing correction data by estimating a value of data in at least one frame period following the frame period of the specific data based on the predetermined regularity, wherein the correction data generating circuit includes a first register for storing the specific data, a processing circuit for providing constant processing on the specific data stored in the first register to estimate the value of the data in at least one frame period following the frame period of the specific data, and a second register for storing a processing result of the processing circuit for at least one frame period, and outputting the processing result stored in the second register as the correction data;

an error detection circuit for receiving the specific data from the first register and the correction data from the second register and detecting a presence of an error in the specific data for each of the plurality of sequential frames, wherein the error detection circuit detects the presence of the error by determining whether or not the specific data maintains the predetermined regularity with respect to data in at least one frame period preceding the frame period of the specific data, wherein the error detection circuit determines whether or not the specific data maintains the predetermined regularity by comparing the specific data with the correction data generated by the correction data generating circuit, wherein the error detection circuit includes a comparison circuit for comparing the specific data with the correction data every time the specific data is input to the first register at a timing estimated by the correction data generating circuit and for determining whether or not the specific data matches with the correction data, the presence of the error being detected based on a comparison result of the comparison circuit; and a selection circuit for receiving the specific data from the first register, the correction data from the second register, and the comparison result from the error detection circuit, wherein the selection circuit outputs the specific data when the comparison result is a match and outputs the correction data when the comparison result is not a match.

16. A CD-ROM decoder for correcting a code error in digital data read out from a ROM disc and divided into frames and for transferring the error-corrected digital data to a host computer, the CD-ROM decoder comprising:

an extracting circuit for extracting address information of a plurality of frames from the digital data;

a target address memory for storing a target address information, the target information being an address location of a particular frame;

a start trigger generating circuit for receiving the address information extracted by the extracting circuit and the target address information stored in the target address memory and comparing the address information extracted by the extracting circuit with the target address information stored in the target address memory and generating a start trigger when the address information coincides with the target address information, thereby starting the digital data transfer to the host computer in response to the start trigger;

a counter for receiving the start trigger from the start trigger generating circuit and counting a frame number of the digital data being transferred to the host computer, thereby generating a count value; and a stop signal generating circuit for receiving the count value from the counter and generating a stop signal when the count value generated by the counter reaches a given value, thereby stopping the digital data transfer to the host computer in response to the stop signal.

\* \* \* \* \*